US 8,363,556 B2

(12) United States Patent
Dunn et al.

(10) Patent No.: US 8,363,556 B2
(45) Date of Patent: Jan. 29, 2013

(54) DYNAMIC PROBE ARCHITECTURE

(75) Inventors: Rodney S. Dunn, Benson, NC (US); Carlos M. Pignataro, Raleigh, NC (US); Michael Lee Sullenberger, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 12/505,861

(22) Filed: Jul. 20, 2009

(65) Prior Publication Data

US 2011/0013520 A1 Jan. 20, 2011

(51) Int. Cl.
*H04L 1/00* (2006.01)

(52) U.S. Cl. ........................................ 370/242; 370/250

(58) Field of Classification Search .................. None
See application file for complete search history.

(56) References Cited

U.S. PATENT DOCUMENTS

| 6,684,336 | B1* | 1/2004 | Banks et al. ................... 709/227 |
|---|---|---|---|
| 7,409,677 | B1* | 8/2008 | Leventhal et al. ............. 717/130 |
| 7,447,901 | B1 | 11/2008 | Sullenberger et al. |
| 7,680,928 | B2* | 3/2010 | Lean et al. ...................... 709/224 |
| 2005/0210133 | A1* | 9/2005 | Florissi et al. ................. 709/224 |
| 2005/0257084 | A1* | 11/2005 | Fairhurst et al. .................. 714/7 |
| 2006/0209695 | A1* | 9/2006 | Archer et al. .................. 370/235 |
| 2008/0089241 | A1* | 4/2008 | Lloyd et al. .................... 370/253 |
| 2009/0034533 | A1 | 2/2009 | Chellappa et al. |
| 2009/0135728 | A1 | 5/2009 | Shen et al. |

* cited by examiner

*Primary Examiner* — Jianye Wu
*Assistant Examiner* — Wanda Z Russell
(74) *Attorney, Agent, or Firm* — Hickman Palermo Truong Becker Bingham Wong LLP

(57) ABSTRACT

Systems, methods and other embodiments associated with dynamic probe generation are described. In one embodiment, an apparatus includes generation logic to dynamically generate a probe configured to identify a status associated with an event occurring in a network device, a path between network devices, and/or a location in an encapsulation stack. Additionally, the apparatus comprises reception logic to receive the status.

31 Claims, 9 Drawing Sheets

DYNAMIC PROBE ARCHITECTURE

BACKGROUND

In a network, routers direct digital information traffic. In one example, two routers can service two networks in a one-to-one relationship. With the one-to-one relationship, one router serves one network while another router serves another network. The networks can have multiple computers, where the computers communicate with a local router. The local router evaluates information sent from a computer and determines if the information's intended destination is local or remote. If the intended destination is local, then the router transfers the information to the intended destination. However, if the intended destination is remote, then the router locates a next-hop router on a path. The local router encapsulates the information for router-to-router travel and transfers the information to the next-hop router. This process is repeated until the information reaches the remote router. The remote router processes the information and sends the information to the intended final destination. Thus, routers facilitate communication among multiple networks.

While a simple example is provided above, many networks are complex. Due to this complexity, there is a relatively high probability for error and/or failure. It can be difficult to determine where the error and/or failure occurred due to the network complexity. Conventionally, extensive resources are dedicated to identifying the error and/or failure.

BRIEF DESCRIPTION OF THE DRAWINGS

The accompanying drawings, which are incorporated in and constitute a part of the specification, illustrate various example systems, methods, and other example embodiments. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DESCRIPTION OF EXAMPLE EMBODIMENTS

Overview

Systems and methods associated with network fault isolation are described. Example systems and methods facilitate embedded dynamic network monitoring and self-troubleshooting by using dynamically generated probes. In one embodiment, the systems and methods may include self-troubleshooting networks. These self-troubleshooting networks may use embedded dynamic network monitoring, and problem detection and isolation for dynamic peering and tunneling protocols. In addition, the systems and methods may include, for example, architecture for embedded dynamic network monitoring, fault detection, analysis, and isolation.

In one embodiment, router operation is observed and analyzed. Based on an analysis result, at least one monitoring session is dynamically created and launched. In one example, the analysis result shows that a protocol event occurred. In response to the protocol event monitoring sessions may be dynamically created and launched on a router related to the protocol event. The monitoring sessions may evaluate various conditions (e.g., reachability and/or network device performance). The evaluation produces a result. While the result may show that operation is normal, the result may conversely show that a failure occurred.

Example Embodiments

Monitoring session results may be correlated together to isolate the failure A summary is generated that reports the failure location to an administrative entity. The administrative entity collects the summary and may correct or work around the failure. In one embodiment, after the correlation the monitoring sessions are deleted to improve network performance. Therefore, monitoring sessions are used to isolate a failure, provide notifications about the failure, and correct or work around the failure with minimal network overhead.

References to "one embodiment", "an embodiment", "one example", "an example", indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Figure 1:
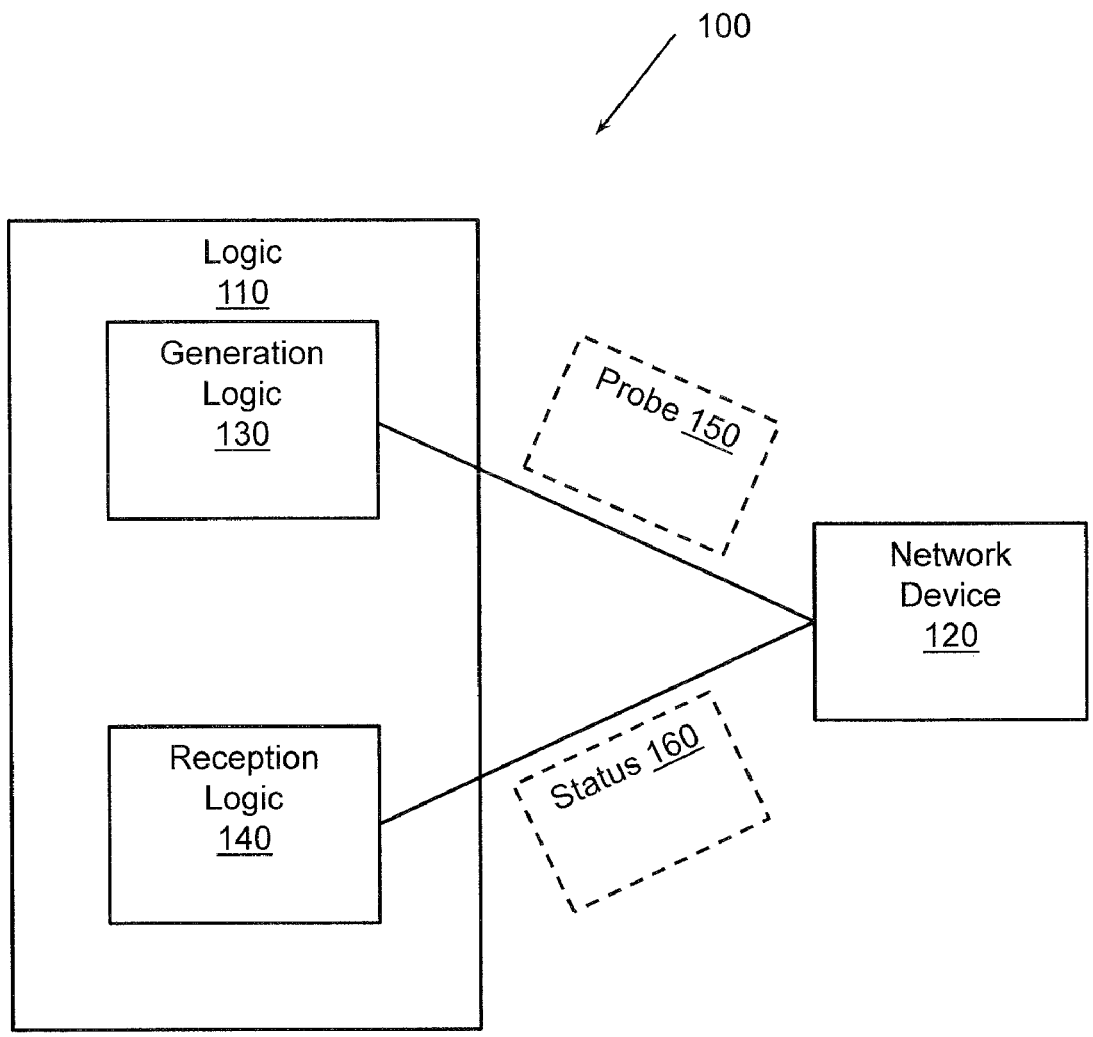
FIG. 1 illustrates an embodiment of a logic and network device that can self-troubleshoot a failure.

FIG. 1 illustrates an embodiment of a system 100 with a logic 110 that dynamically troubleshoots a network with a network device 120 (e.g., a router). A person of skill in the art will appreciate that a network device may be, for example, a network element, or a network entity. The logic 110 includes generation logic 130 and reception logic 140.

Logic 110 acts in response to a protocol event. A protocol event may concern, for example, protocol dynamic peering, tunnel creation, signaling, tunnel encapsulation, tunnel endpoint discovery, dynamic peering, setup, receiving tunnel information, failure, and unusual operation. The protocol event may occur in the network device 120, a path between network devices, or a location in an encapsulation stack. A protocol event occurs and the generation logic 130 dynamically generates a probe 150 to identify a status associated with the protocol event. The probe 150 may be, for example, a software probe that runs a diagnostic test. The generation logic 130 receives an event notice, dynamically generates the probe 150, and launches the probe 150 on or towards the network device 120. Example probe functions can include monitoring reachability, detecting blackholes, measuring performance, measuring quality, and comparing efficiency. In one example, the probe 150 may be a network probe that is sent towards a remote router. A determination is made concerning whether the probe 150 reaches the network device 120. If the probe fails to reach the network device, then the probe 150 identifies that a reachability status is a failure and may send a status notification to the logic 110.

The logic 110 can monitor the probe 150 and obtain a status 160 (e.g., network device status and/or probe status). The probe 150 produces the status 160. In one example, the probe 150 produces a status 160 that is binary. In this example, a status failure is '0' and a status non-failure is '1'. However, the probe 150 can be more complex and provide a more detailed status 160. In addition, more than one probe can be used to determine a status 160. Example probe types can include IP (Internet Protocol) SLA (Service Level Agreement), BFD (Bidirectional Forwarding Detection), GRE (Generic Routing Encapsulation), Keepalive, IPsec (Internet Protocol Security) keepalive, traceroute to the peer address, ping the IP Next Hop or further destination, ARP (Address Resolution Protocol) entry status, or a modified application protocol message that acts as a no-operation for the application. While employed in the network device 120, the probe 150 may transfer the status 160 to the logic 110, the logic 110 may monitor the probe 150, and determine if the probe 150 reaches the network device 120.

The reception logic 140 receives the status 160 from the network device 120. In one embodiment, the network device 120 is in a DMVPN (Dynamic Multipoint Virtual Private Network)/IPSec environment. In this environment, crypto tunnels are set up dynamically by NHRP (Next Hop Resolution Protocol). The received status 160 can be correlated with other statuses to isolate fault location without extensive network overhead.

Figure 2:
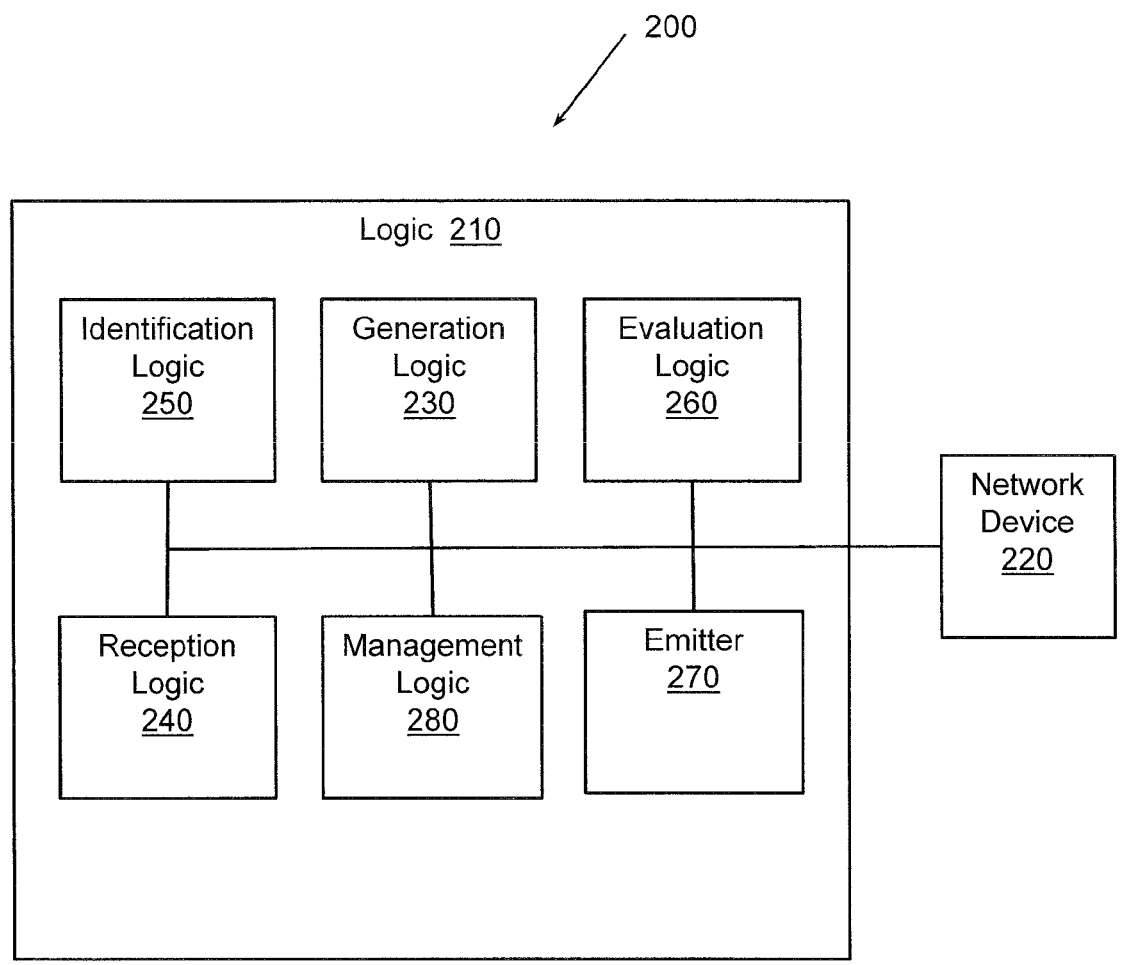
FIG. 2 illustrates an embodiment of a logic and network device that can self-troubleshoot a failure.

FIG. 2 illustrates an embodiment of a system 200 with a logic 210 that dynamically troubleshoots a network with a network device 220. The network device 220 may experience a protocol event. Identification logic 250 identifies the protocol event. The logic 210 includes generation logic 230 that dynamically generates a probe in response to the event. In order to determine how to generate the probe, evaluation logic 260 is employed. In one embodiment, the evaluation logic 260 evaluates protocol dynamic peering to produce an output. In another embodiment, the evaluation logic 260 evaluates a tunnel endpoint discovery and setup mechanism to produce an output. Based, at least in part, on the output the generation logic 230 dynamically generates a probe. The generated probe is launched on or to the network device 220.

The logic 210 can also include reception logic 240 that receives a status produced by the probe. The probe may produce a notice that includes the status. The notice is received by the reception logic 240. In one example, the function desired by the probe might be determining if there is a failure at a protocol stack level. Once a probe performs a desired function, the probe may be deleted. Management logic 280 deletes the probe after the status is received.

The logic 210 includes an emitter 270 that provides a signal with at least a status portion. In one embodiment, the logic 210 isolates a network error but does not correct the error or determine how the error should be corrected. Therefore, the emitter 270 generates and transfers an error notification message to an entity. The entity may perform the determination and correction. In another embodiment, the emitter 270 may suggest how to correct the error and/or determine what entity should receive the signal. Therefore, an appropriate entity may receive a failure notice. The notice may also list a failure location. This may be done with relatively low operational overhead.

Figure 3:
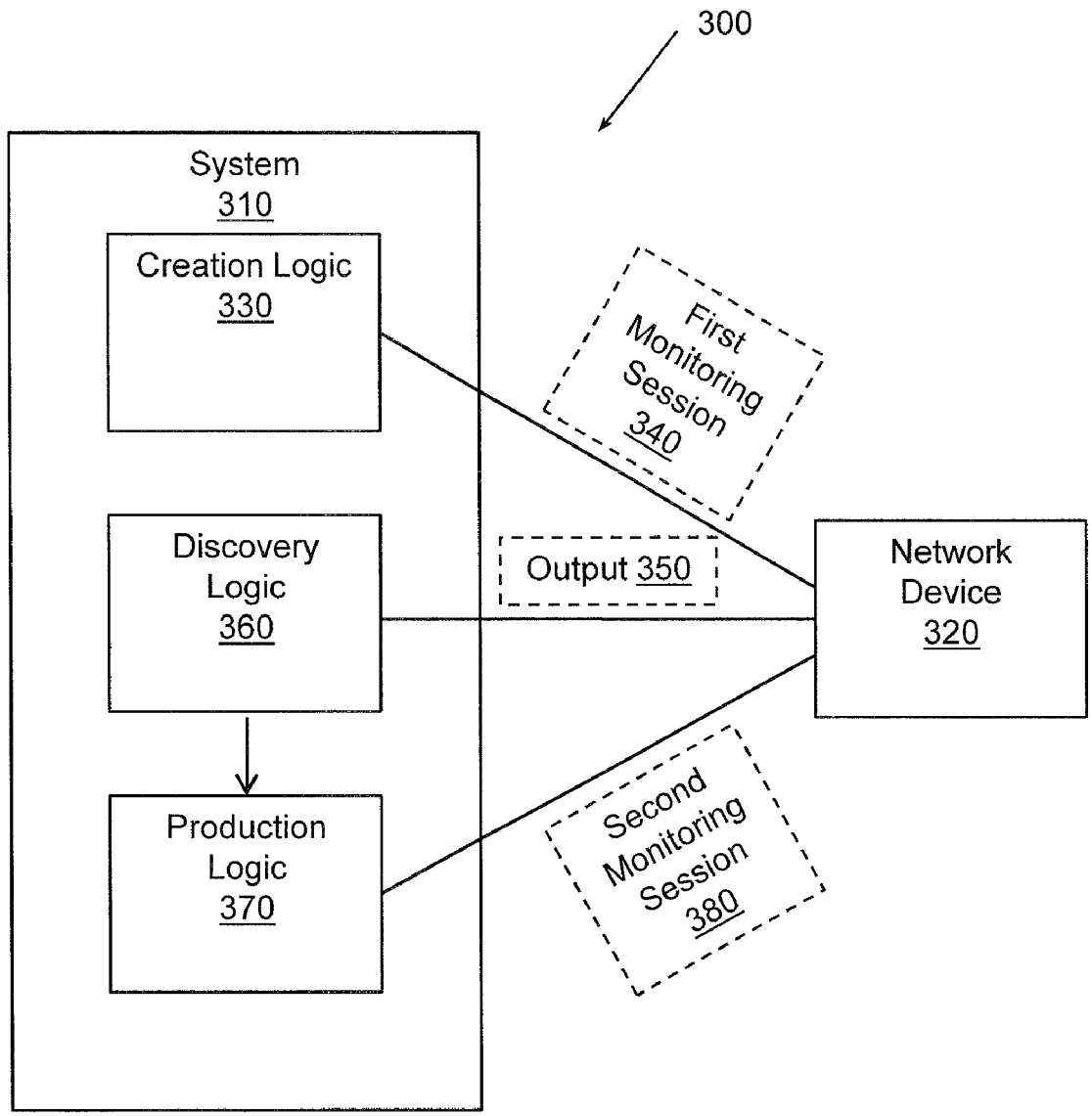
FIG. 3 illustrates an embodiment of a probe management system.

FIG. 3 illustrates an embodiment of configuration 300 with a system 310 that manages monitoring sessions on a network device 320. Creation logic 330 operates as means for dynamically generating a first monitoring session 340 to run at a first level in a network device protocol stack. Example network device protocol stacks include GRE over IPsec over IPv4 (Internet Protocol version 4), IPv6 (Internet Protocol version 6) over L2TPv3 (Layer 2 Tunneling Protocol Version 3) over IPv4, Ethernet over MPLS (Multiprotocol Label Switching) LSP (Label Switched Path) over GRE, Pseudowires, and Softwires. The creation logic 330 launches the first monitoring session 340 on the network device 320. In one embodiment, the first monitoring session 340 includes a specific task. In one example, the task may be detecting if there is a failure at a particular stack level.

The first monitoring session 340 operates on the network device 320 and produces an output 350. The output 350 is a first monitoring session operation result. In one example, the output can include 'pass', 'fail', or 'unable to determine'. The output 350 transfers to a discovery logic 360. The discovery logic 360 processes the output 350. The discovery logic 360 functions as means for identifying a failure based, at least in part, on the output 350 produced by the first monitoring session 340.

The discovery logic 360 sends a failure notice to a production logic 370. In turn, the production logic 370 operates as means for dynamically generating a second monitoring session 380. The second monitoring session 380 may run at a second level in the network device protocol stack. In one embodiment, the second level is lower in a network device protocol stack hierarchy than the first level.

it is to be appreciated that while the creation logic 330 and production logic 370 are depicted as separate entities, they could be implemented as one unit. Additionally, the creation logic 330 and production logic 370 can function in more than one instance. In one example, a third monitoring session can be generated and run based on a failure identified from the second monitoring session 380. The system 310 can continue this operation until isolation is performed.

While not shown, the system 310 can include other logic that performs other functionality. For instance, the system 310 can include identification logic 250 and/or reception logic 240 (see FIG. 2). The identification logic 250 can be implemented as means for identifying a protocol event. First monitoring session dynamic generation may occur in response to identifying the protocol event. Additionally, the reception logic 240 can be implemented as means for receiving a status produced from the second monitoring session. Therefore, the system 310 can allow self-troubleshooting in relation to a protocol event.

Figure 4:
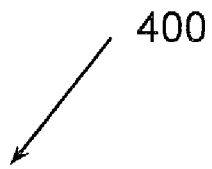
FIG. 4 illustrates an embodiment of a failure map.

FIG. 4 illustrates an embodiment of a failure map 400 that operates in a network device. The failure map 400 may be, for example, a matrix or a tree structure. In one example, the failure map 400 includes four layers (1-4) and runs four applications (A-D). The applications are designated by the abbreviation 'App'. Sixteen probes can be launched on the failure map 400 in response to a failure. One probe launches in individual layer/application combinations. The probes produce a status. The failure map 400 uses 'X' for a fail status and an 'O' for a pass status. In the failure map 400, the probes associated with application B report failures while no other failures are reported. A correlation can be drawn that application B is the failure location. A network device can function to isolate application B so other errors do not occur or other errors are minimized. Correlation can occur vertically along an encapsulation stack. However, correlation can also occur along a network device path, a time delta, or between the first and second probes. Additionally, correlation can occur both along the encapsulation stack and along the network device path. In another example, the correlation may use a bi-dimensional tree structure, a tri-dimensional tree structure, or an n-dimensional tree structure. Therefore, isolation occurs without network administrator involvement.

Figure 5:
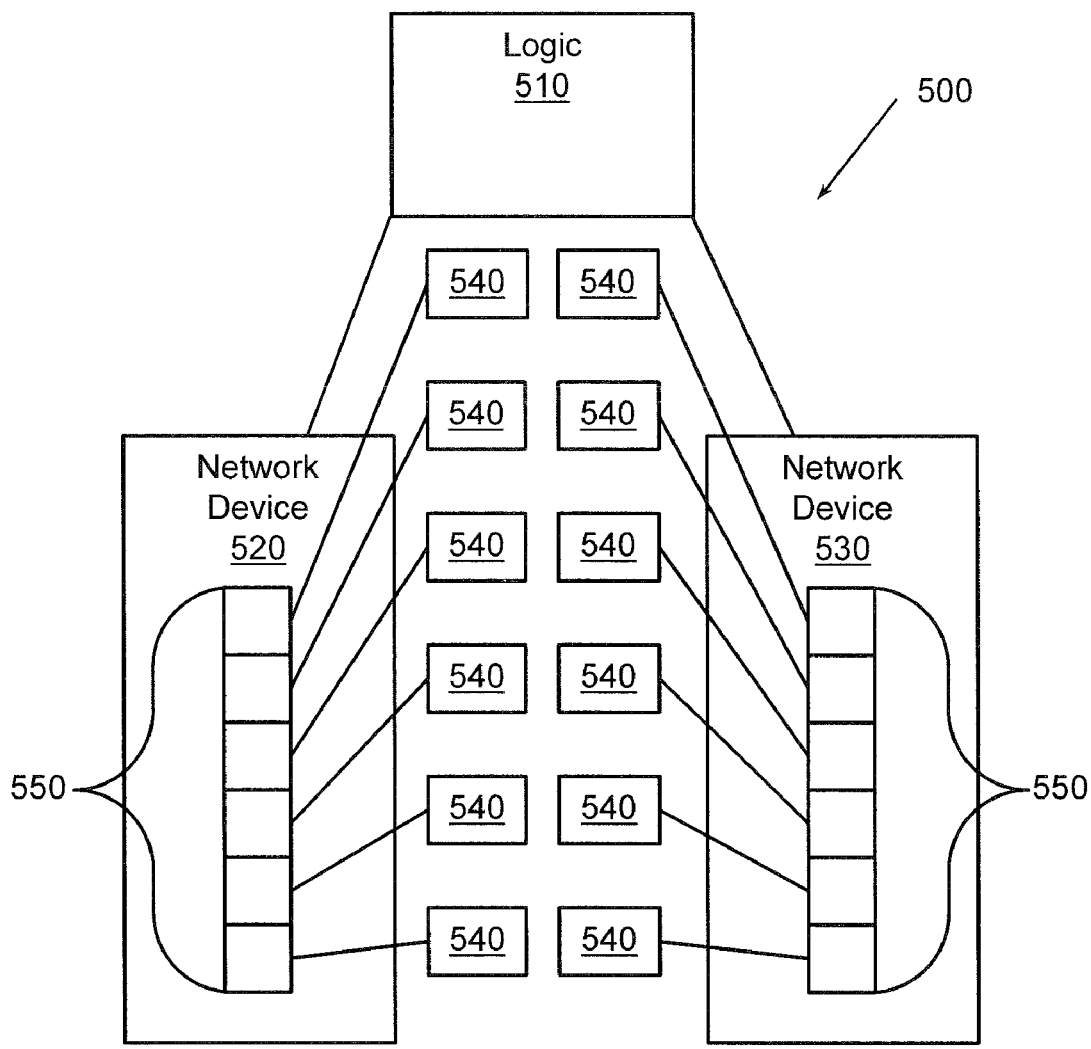
FIG. 5 illustrates an embodiment of a network with probes.

FIG. 5 illustrates an embodiment of a network 500. Logic 510 can communicate with network devices 520 and 530 (e.g., routers). When a protocol event occurs, the logic 510 launches probes 540. The probes 540 can run on protocol stacks 550. In one embodiment, probes 540 are launched in a number equal to stack layers in network devices relevant to the protocol event. In this embodiment, the probes 540 apply to stack layers in a one-to-one relationship. In another embodiment, fewer probes are launched.

The following is a network operation example. Network device 520 can create a tunnel between the network device 520 and the network device 530. Tunnel creation is an example protocol event that may be noticed and responded to. In response to detecting the protocol event, the logic 510 dynamically generates at least one probe 540. In one example, more probes 540 are generated. The probes 540 are launched on the network devices 520 and/or 530. The logic 510 may communicate with network device 520 and not with network device 530, may communicate with network device 530 and not with network device 520, or may communicate with both network devices 520 and 530. The logic 510 may be embedded in network device 520, may be embedded in network device 530, may be distributed across network devices 520 and 530, and may be a separate entity and act as a proxy. After launch, the probes 540 can monitor for a failure. When a failure occurs, a probe 540 sends a status report to the logic 510. The logic 510 can collect the report and isolate the failure. However, the probes 540 may find no errors. A report may be sent that the network 500 is error free regarding the protocol event. In one embodiment, the logic 510 includes at least part of the logic 210 of FIG. 2 and/or the system 310 of FIG. 3. In another embodiment, the logic 510 resides on the network device 520 and/or the network device 530.

Figure 6:
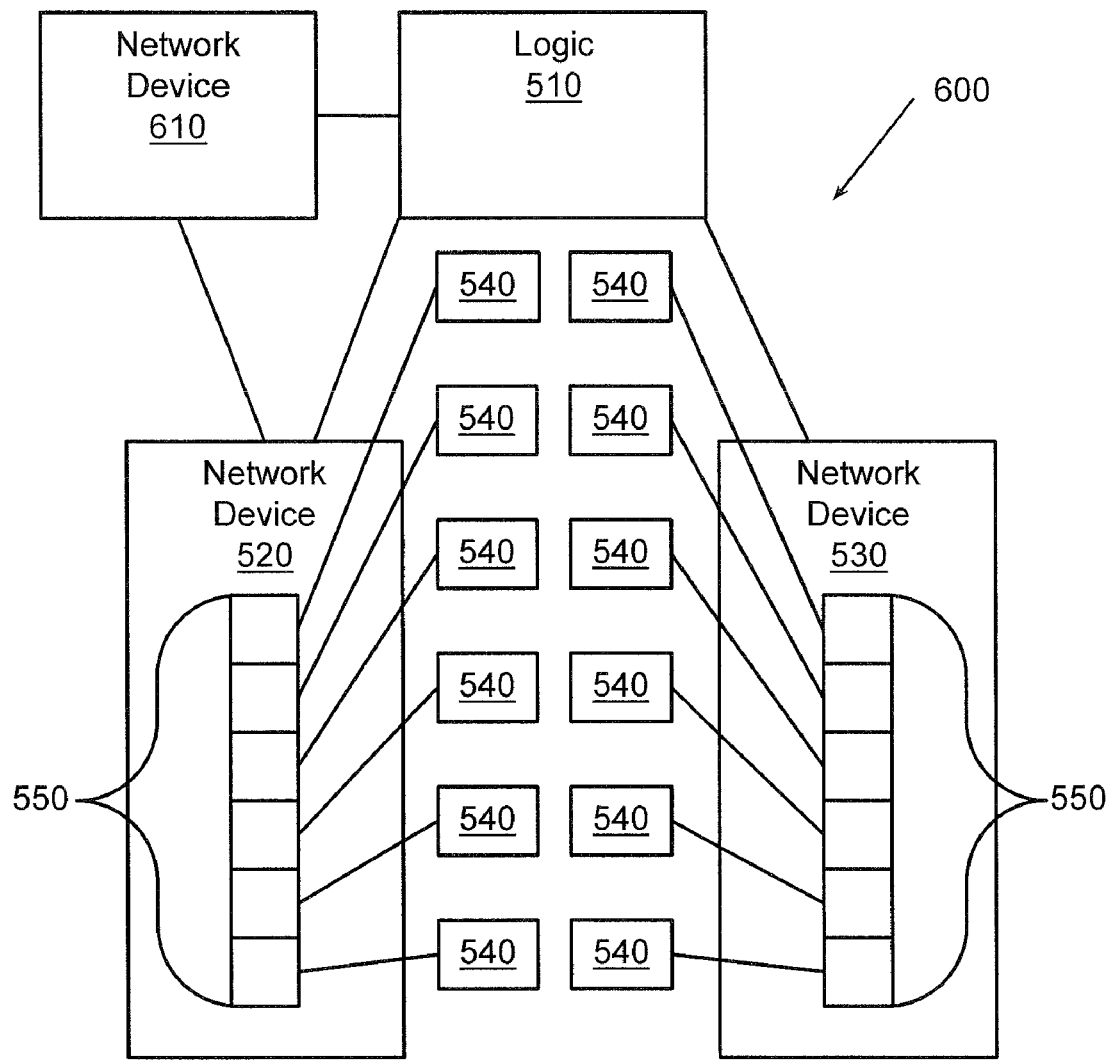
FIG. 6 illustrates an embodiment of a network with probes and an additional network device.

FIG. 6 illustrates an embodiment of a network 600. The network 600 is similar to the network 500 of FIG. 5 but includes an additional network device 610. The network 600 includes logic 510 and network devices 520, 530, and 610. The network device 610 can observe a protocol event related to network devices 520 and 530 and request that operations related to the event be performed. In one example, the protocol event can be to set up a tunnel and the network device 610 can request to be included in the tunnel. In another example, the protocol event may be an error. The error may be, for example, on a network device, in a path to a network device, or a path between network devices. Probes 540 can be created and launched on stacks 550 as well as on the network device 610. In one example, an attempt can be made to launch the probes 540 on the network device 610. However, the probes can fail to reach the network device 610 and an error message can be generated notifying the logic 510 of a failure status. Therefore, probes 540 can by dynamically created and used with minimal network overhead.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic. The physical manipulations create a concrete, tangible, useful, real-world result.

It has proven convenient at times, principally for reasons of common usage, to refer to these signals as bits, values, elements, symbols, characters, terms, and numbers. It should be borne in mind, however that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical (electronic) quantities.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 7:
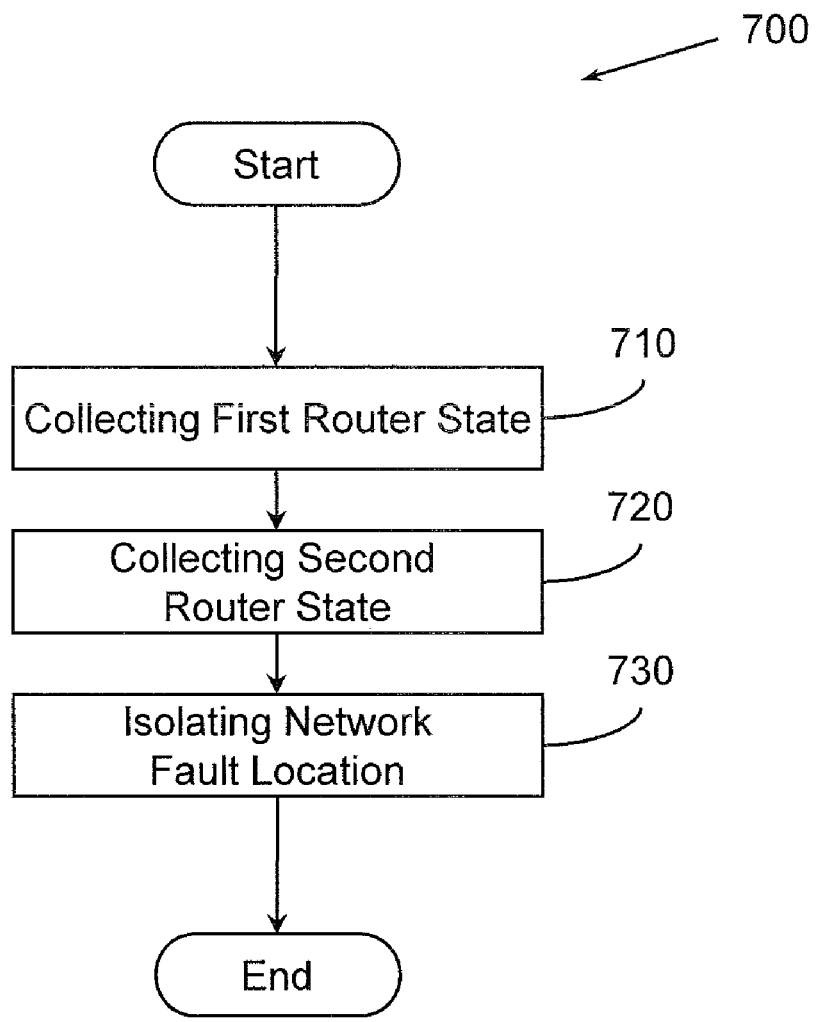
FIG. 7 illustrates an embodiment of a method associated with a self-troubleshooting network.

FIG. 7 illustrates an embodiment of a method 700 for isolating a network failure. When a protocol event occurs, multiple probes are dynamically generated and launched. The probes run on network devices. The probes make various determinations while running. Determination results are transferred to a central processing location where they are analyzed. A network failure location may be isolated based on the analysis. Therefore, a network can self-troubleshoot to determine fault location with minimal network overhead.

Initiation logic launches two probes (e.g., first probe, second probe) on a network device. The probes are launched in response to a protocol event. The first probe runs, determines a first network device state, and transfers the first network device state. The first network device state from the first probe is collected at 710 and can be retained in storage. The second network device state from the second probe is collected at 720 and can be retained in storage. In one embodiment, the first probe and second probe are sent to different network devices. In another embodiment, the first probe and the second probe are launched in parallel. The retained device states may be processed. Based on a processing result, a network fault location may be isolated if a fault exists.

The network fault location is isolated at 730. The isolation is based, at least in part, on correlating the first network device state and the second network device state. While being shown with two network device states, it is to be appreciated that correlation can occur by using more than two network device states.

The following is an example of method 700. A three-layer protocol stack operates on a network device. The stack includes a first layer being a highest layer and a third layer being a lowest layer. A general probe is launched on the network device to detect a failure. The general probe communicates that there is a failure upon detection. The failure can be considered a protocol event and cause a first probe and a second probe to launch. The first probe and second probe can launch at about the same time or launch at different times. In one example, after the first network device state is collected the second probe is launched. The first probe runs on the first layer while the second runs on a second layer. In an alternate example, a first probe is created inside a tunnel and a second probe is created outside a tunnel to determine reachability.

The first probe and second probe transfer network device states that are collected. A correlation is made based on the collected network device states. In a first example, there can be a failure on the first layer and a pass on the second layer. A layer may be an encapsulation layer or a hop. An inference is drawn that the failure location is on the first layer since the second layer passes. Therefore, the first layer is isolated as the network fault location. In a second example, both probes can show that their respective layers experienced failure. However, it is unknown if the failure is located at the second level or third level. A third probe is launched to the third layer. A third layer network device state is collected and correlated with the outer network device states to isolate the network fault location. Therefore, correlation occurs to isolate a network fault location with minimal network overhead.

A "computer-readable medium", as used herein, refers to a medium that stores signals, instructions and/or data. A computer-readable medium may take forms, including, but not limited to, non-volatile media, and volatile media. Non-volatile media may include, for example, optical disks and magnetic disks. Volatile media may include, for example, semiconductor memories and dynamic memory. Common forms of a computer-readable medium may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Figure 8:
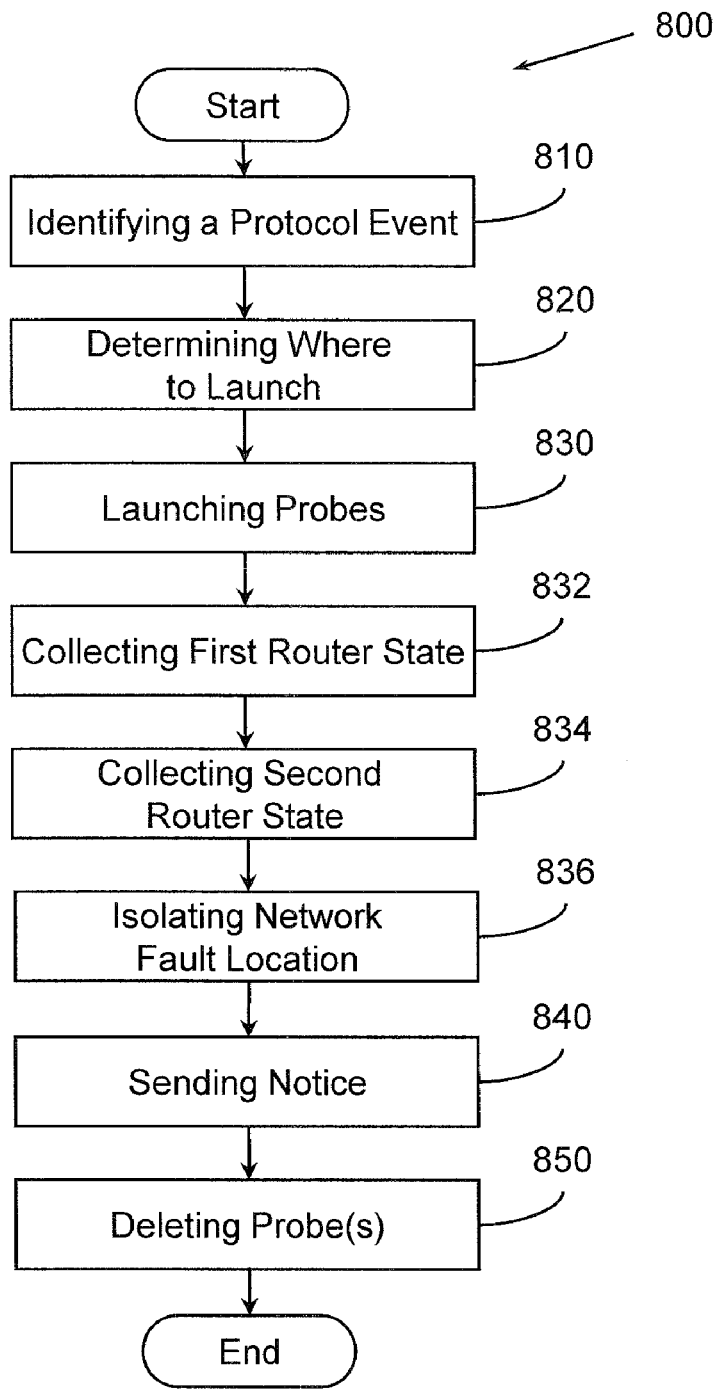
FIG. 8 illustrates an embodiment of a method associated with a self-troubleshooting network.

FIG. 8 illustrates an embodiment of a method 800 for isolating a network failure. Similar to method 700 (FIG. 7), the method 800 uses probes to determine a network fault location. A location notice is created and sent to an entity. In one example, the entity can be self-correction logic or a network administrator's computer. Therefore, without having to actively search, a correction entity can receive a fault location notice.

An initial probe is launched to monitor for a protocol event. The initial probe may be dynamically generated based on an initial trigger protocol event or signaling. The initial probe sends an event notice when the protocol event occurs. The notice is transferred allowing for protocol event identification at 810. In response to the protocol event, a first probe and a second probe are launched. In one embodiment, the first probe and second probe inter-relate. Inter-relation examples include that the first probe can depend on the second probe or that the first probe and second probe can function on one network device encapsulation stack.

A determination is made at 820 on where to launch the first probe and the second probe. The determination is based, at least in part, on the protocol event. A notice for where to launch is sent to an apparatus. The notice controls the apparatus to launch the first probe and the second probe at 830 in response to the protocol event. For instance, the launch occurs, at least in part, in response to identifying the protocol event. In an example, a Border Gateway Protocol peer performs 810, 820, and/or 830. In one embodiment, the first probe and the second probe are launched together.

The launched probes operate on the network device and transfers network device states. A processing entity collects a first network device state from a first probe at 832 and collects a second network device state from a second probe at 834. The network device states are processed to correlate the first network device state and the second network device state. In one embodiment, correlation occurs along an encapsulation stack. In another embodiment, correlation occurs along a network device path. Both correlation types may occur simultaneously, allowing for correlation up-and-down a stack as well as along a path. Furthermore, other correlations can occur. In one example, the first probe and second probe can launch on one stack layer. If the first probe reports an error and later the second probe reports a pass, then time can be a consideration in performing correlation.

Based, at least in part, on correlating the first network device state and the second network device state isolating a network fault location occurs at 836. A notification is created that identifies the network fault location. The notification is sent at 840. Probes, including the first probe and/or the second probe, are deleted at 850 after isolating the network fault location. Therefore, fault location can be isolated without lingering effect on the network.

Figure 9:
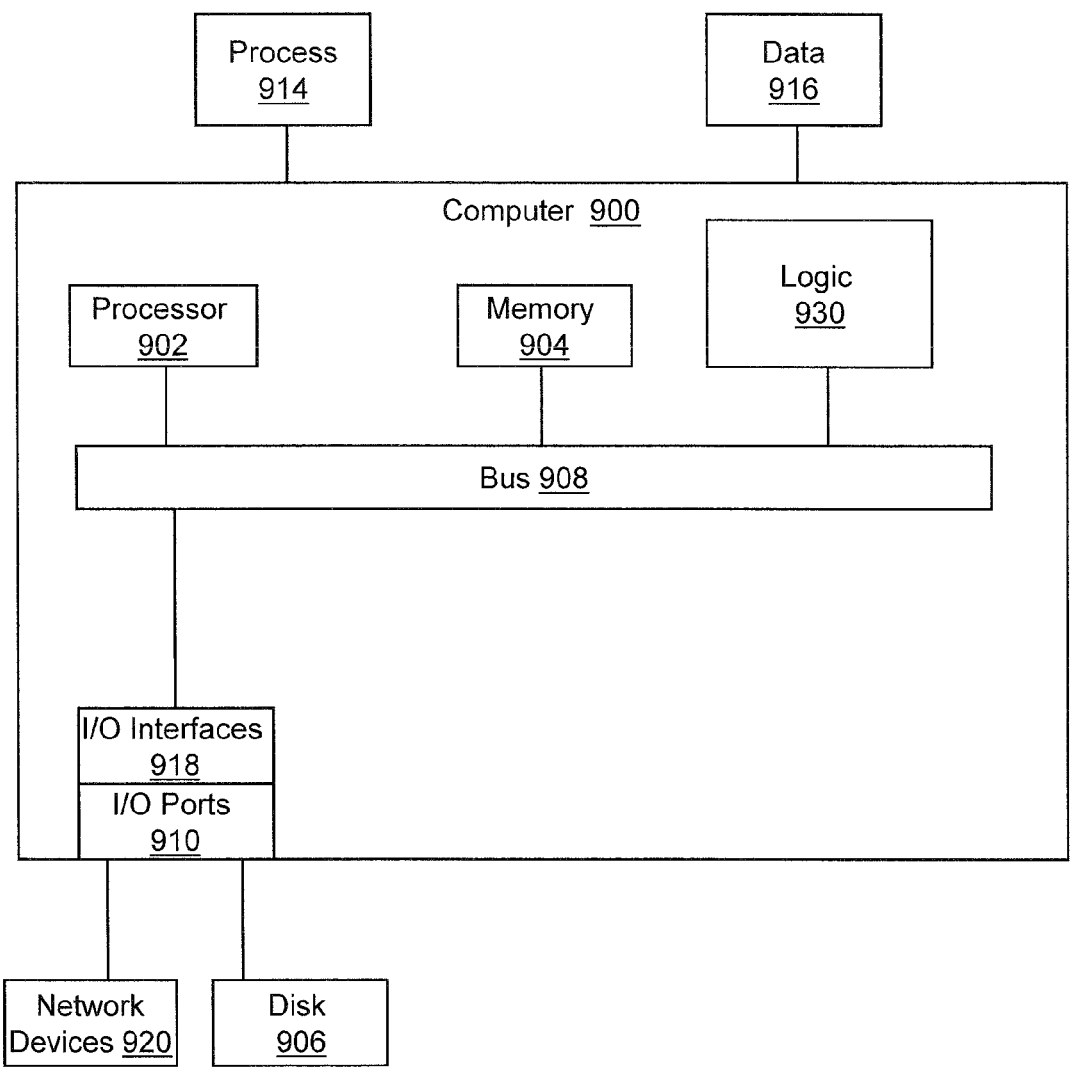
FIG. 9 illustrates an embodiment of a computing environment in which example systems and methods of dynamic network device probe generation, and equivalents, may operate.

FIG. 9 illustrates an example computing device in which example systems and methods described herein, and equivalents, may operate. The example computing device may be a computer 900 that includes a processor 902, a memory 904, and input/output ports 910 operably connected by a bus 908. In one example, the computer 900 may include a logic 930 configured to isolate and/or manage a protocol event. In different examples, the logic 930 may be implemented in hardware, software, firmware, and/or combinations thereof. While the logic 930 is illustrated as a hardware component attached to the bus 908, it is to be appreciated that in one example, the logic 930 could be implemented in the processor 902.

Thus, logic 930 may function as logic 210 (see FIG. 2) or the system 310 (see FIG. 3). The logic 930 may be implemented, for example, as an ASIC. The logic 930 may also be implemented as computer executable instructions that are presented to computer 900 as data 916 that are temporarily stored in memory 904 and then executed by processor 902.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM or PROM volatile memory may include, for example, RAM, SRAM, and DRAM.

A disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, and a memory stick. Furthermore, the disk 906 may be a CD-ROM drive, a CD-R drive, a CD-RW drive, a DVD ROM drive, a Blu-Ray drive, and an HD-DVD drive. The memory 904 can store a process 914 and/or a data 916, for example. The disk 906 and/or the memory 904 can store an operating system that controls and allocates resources of the computer 900.

The bus 908 may be a single internal bus interconnect architecture and/or other bus or mesh architectures. While a single bus is illustrated, it is to be appreciated that the computer 900 may communicate with various devices, logics, and peripherals using other busses (e.g., PCIE, 1394, USB, Ethernet). The bus 908 can be types including, for example, a memory bus, a memory controller, a peripheral bus, an external bus, a crossbar switch, and/or a local bus.

The computer 900 may interact with input/output devices via the i/o interfaces 918 and the input/output ports 910. Input/output devices may be, for example, a keyboard, a microphone, a pointing and selection device, cameras, video cards, displays, the disk 906, and the network devices 920. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

While example systems and methods have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems and methods described herein. Therefore, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, and AABBCC (e.g., the data store may store only A, only B, only C, A&B, A&C, B&C, A&B&C, A&A&A, A&A&B, A&A&B&B, A&A&B&B&C, and A&A&B&B&C&C). It is not intended to require one of A, one of B, and one of C. When the applicants intend to indicate "at least one of A, at least one of B and at least one of C", then the phrasing "at least one of A, at least one of B, and at least one of C" will be employed.

What is claimed is:

1. An apparatus, comprising:
one or more processors coupled to generation logic and reception logic;
the generation logic configured to dynamically create, in response to detecting an event that occurred in one or more of:
a first network device other than the apparatus,
a first path between network devices, or
a first location in an encapsulation stack,
a first probe that is configured to run a first diagnostic test on the one or more of:
the first network device,
the first path between the network devices, or
the first location in the encapsulation stack;
wherein the generation logic is further configured to launch the test network traffic towards a remote network device; and
the reception logic configured to receive, in response to the first diagnostic test, a first status of the one or more of:
the first network device,
the first path between network devices, or
the first location in the encapsulation stack;
wherein the generation logic is further configured to create, in response to detecting the event, a second probe that is configured to run a second diagnostic test on one or more of:
a different network device,
a different path between network devices, or
a different location in the encapsulation stack;
wherein the reception logic is further configured to receive, in response to the second diagnostic test, a second status of the one or more of:
the different network device,
the different path between network devices, or
the different location in the encapsulation stack;
management logic configured to delete the first probe after the first status is received and the second probe after the second status is received;
the apparatus further comprising a processing entity configured to isolate a network fault location at least in part by correlating the first status and the second status.

2. The apparatus of claim 1, where the event was caused by a failure related to the one or more of the first network device, the first path between network devices, or the first location in the encapsulation stack.

3. The apparatus of claim 1, where the apparatus is a router.

4. The apparatus of claim 1, wherein the first diagnostic test is caused by one of an Internet Protocol Service Level Agreement probe, a Bidirectional Forwarding Detection probe, a Generic Routing Encapsulation probe, a Keepalive probe, an Internet Protocol Security keepalive probe, a probe that performs a traceroute to the remote network device, a probe that pings the remote network device, or an Address Resolution Protocol entry status probe.

5. The apparatus of claim 1, wherein the first diagnostic test is caused by a modified application protocol message that acts as a no-operation for an application.

6. The apparatus of claim 1, wherein the first status indicates whether or not the remote network device was reachable during the first diagnostic test.

7. The apparatus of claim 1, wherein the first diagnostic test tests a combination of a first application and a first layer.

8. The apparatus of claim 1, wherein the first diagnostic test is associated with a first combination of a first application and a first layer;
wherein the second diagnostic test is associated with a second combination of a second application and a second layer, and wherein the second combination is different than the first combination.

9. The apparatus of claim 8, wherein the processing entity is configured to isolate the network fault at least in part by correlating failures of plural diagnostic tests associated with a particular application.

10. The apparatus of claim 8, wherein the processing entity is configured to isolate the network fault at least in part by correlating failures of plural diagnostic tests associated with a particular layer in the encapsulation stack.

11. The apparatus of claim 1, wherein the event was caused by unusual operation of the one or more of the first network device, the first path between the network devices, or the first location in the encapsulation stack.

12. A non-transitory computer-readable medium storing instructions which, when executed by one or more processors of a particular computing device, cause the one or more processors to perform:
dynamically creating, in response to detecting an event that occurred in one or more of:
a first network device other than the particular computing device,
a first path between network devices, or
a first location in an encapsulation stack,
a first probe that is configured to run a first diagnostic test on the one or more of:
the first network device,
the first path between the network devices, or
the first location in the encapsulation stack;
launching the test network traffic towards a remote network device;
receiving, in response to the first diagnostic test, a first status of the one or more of:
the first network device,
the first path between network devices, or
the first location in the encapsulation stack;
creating, in response to detecting the event, a second probe that is configured to run a second diagnostic test on one or more of:
a different network device,
a different path between network devices, or
a different location in the encapsulation stack;
receiving, in response to the second diagnostic test, a second status of the one or more of:
the different network device,
the different path between network devices, or
the different location in the encapsulation stack;
deleting the first probe after the first status is received and the second probe after the second status is received;
isolating a network fault location at least in part by correlating the first status and the second status.

13. The non-transitory computer-readable medium of claim 12, where the event was caused by a failure related to the one or more of the first network device, the first path between the network devices, or the first location in the encapsulation stack.

14. The non-transitory computer-readable medium of claim 12, wherein the first diagnostic test is caused by one of an Internet Protocol Service Level Agreement probe, a Bidirectional Forwarding Detection probe, a Generic Routing Encapsulation probe, a Keepalive probe, an Internet Protocol Security keepalive probe, a probe that performs a traceroute to the remote network device, a probe that pings the remote network device, or an Address Resolution Protocol entry status probe.

15. The non-transitory computer-readable medium of claim 12, wherein the first diagnostic test is caused by a modified application protocol message that acts as a no-operation for an application.

16. The non-transitory computer-readable medium of claim 12, wherein the first status indicates whether or not the remote network device was reachable during the first diagnostic test.

17. The non-transitory computer-readable medium of claim 12, wherein the first diagnostic test tests a combination of a first application and a first layer.

18. The non-transitory computer-readable medium of claim 12, wherein the first diagnostic test is associated with a first combination of a first application and a first layer, and wherein the second diagnostic test is associated with a second combination of a second application and a second layer, and wherein the second combination is different than the first combination.

19. The non-transitory computer-readable medium of claim 18, wherein the instructions, when executed by the one or more processors, cause the one or more processors to perform isolating the network fault at least in part by correlating failures of plural diagnostic tests associated with a particular application.

20. The non-transitory computer-readable medium of claim 18, wherein the instructions, when executed by the one or more processors, cause the one or more processors to perform isolating the network fault at least in part by correlating failures of plural diagnostic tests associated with a particular layer in the encapsulation stack.

21. A method comprising:
one or more computer processors of a particular computing device dynamically creating, in response to detecting an event that occurred in one or more of:
a first network device other than the particular computing device,
a first path between network devices, or
a first location in an encapsulation stack,
a first probe configured to run a first diagnostic test on the one or more of:
the first network device,
the first path between the network devices, or
the first location in the encapsulation stack;
launching the test network traffic towards a remote network device;
the one or more computer processors receiving, in response to the first diagnostic test, a first status of the one or more of:
the network device,
the first path between network devices, or
the first location in the encapsulation stack;
the one or more computer processors creating, in response to detecting the event, a second probe that is configured to run a second diagnostic test on one or more of:
a different network device,
a different path between network devices, or
a different location in the encapsulation stack;
the one or more computer processors receiving, in response to the second diagnostic test, a second status of the one or more of:
the different network device,
the different path between network devices, or
the different location in the encapsulation stack;
the one or more computer processors deleting the first probe after the first status is received and the second probe after the second status is received;
the one or more computer processors isolating a network fault location at least in part by correlating the first status and the second status.

22. The method of claim 21, wherein the event was caused by a failure related to the one or more of the first network device, the first path between network devices, or the first location in the encapsulation stack.

23. The method of claim 21, wherein the first diagnostic test is caused by one of an Internet Protocol Service Level Agreement probe, a Bidirectional Forwarding Detection probe, a Generic Routing Encapsulation probe, a Keepalive probe, an Internet Protocol Security keepalive probe, a probe that performs a traceroute to the remote network device, a probe that pings the remote network device, or an Address Resolution Protocol entry status probe.

24. The method of claim 21, wherein the first diagnostic test is caused by a modified application protocol message that acts as a no-operation for an application.

25. The method of claim 21, wherein the first status indicates whether or not the remote network device was reachable during the first diagnostic test.

26. The method of claim 21, wherein the first diagnostic test tests a combination of a first application and a first layer.

27. The method of claim 21, wherein the first diagnostic test is associated with a first combination of a first application and a first layer;
  wherein the second diagnostic test is associated with a second combination of a second application and a second layer, and wherein the second combination is different than the first combination.

28. The method of claim 27, wherein the processing entity causes the one or more computer processors to perform isolating the network fault at least in part by correlating failures of plural diagnostic tests associated with a particular application.

29. The method of claim 27, wherein the processing entity causes the one or more computer processors to perform isolating the network fault at least in part by correlating failures of plural diagnostic tests associated with a particular layer in the encapsulation stack.

30. The non-transitory computer-readable medium of claim 12, wherein the event was caused by unusual operation of the one or more of the first network device, the first path between the network devices, or the first location in the encapsulation stack.

31. The method of claim 21, wherein the event was caused by unusual operation of the one or more of the first network device, the first path between the network devices, or the first location in the encapsulation stack.

* * * * *